(No Model.)
J. R. CARTER.
COTTON PLANTER.
No. 245,703. Patented Aug. 16, 1881.
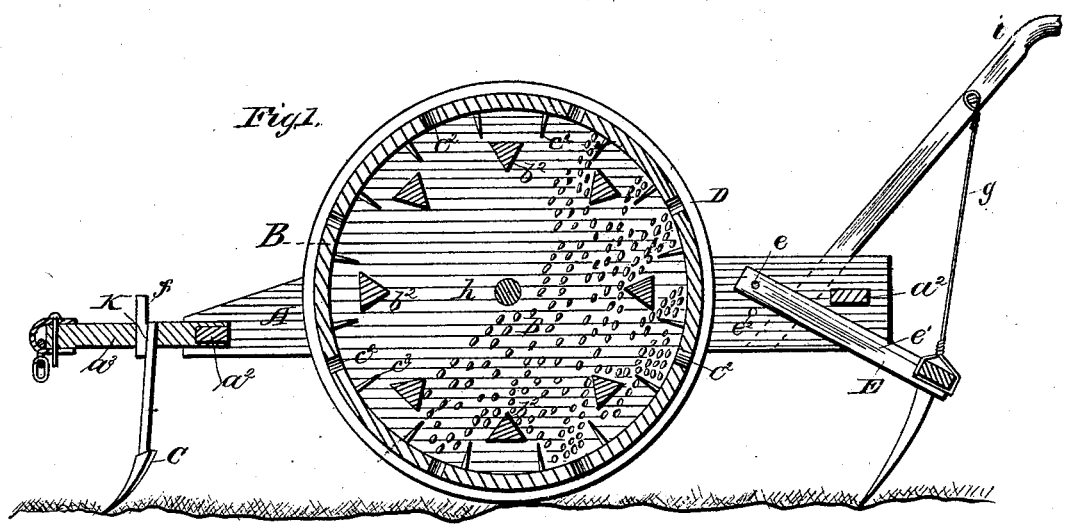
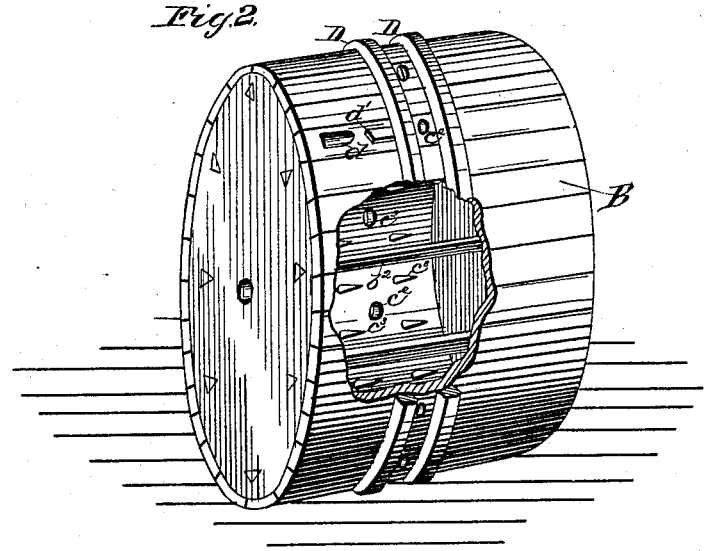
WITNESSES
Fred. G. Dieterich.
Will R. Omohundro.
INVENTOR
J. R. Carter
By J. S. Duffie
Atty.

UNITED STATES PATENT OFFICE.

JOHN R. CARTER, OF ROCK MILLS, SOUTH CAROLINA.

COTTON-PLANTER.

SPECIFICATION forming part of Letters Patent No. 245,703, dated August 16, 1881.

Application filed June 14, 1881. (No model.)

*To all whom it may concern:*

Be it known that I, JOHN R. CARTER, a citizen of the United States, residing at Rock Mills, in the county of Anderson and State of South Carolina, have invented certain new and useful Improvements in Cotton-Planters; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The nature of my invention consists of the novel construction and arrangement of a cotton-seed planter consisting of an adjustable plow-point or furrow-opener in front, a seed-dropper, called the "drum," which follows the plow, and, rolling on the ground, bears up the frame-work of the machine and drops the seeds into the furrow, and a self-adjusting harrow in the rear, that covers up the seeds dropped by the drum, all secured in a proper frame-work with suitable bearings and fastenings, as are hereinafter more fully described and set forth.

Figure 1 is a longitudinal side view of my cotton-seed planter cut through its center, showing the construction of the machine, and with the spikes and triangular-shaped bars on the inside of the drum. Fig. 2 is a perspective view of the drum with part of its front side cut away, the better to show the holes $c^2$, through which the seeds are designed to be dropped, and the rows of spikes $c^3$ on either side of the track of the row of the holes, together with the construction of the drum, showing its two bands D D passing entirely around its middle, one on either side of the row of holes $e^2$, and the slide-gate $d$, with the wedge $d'$.

My cotton-seed planter is described as follows: The frame-work A should be made about two and a half or three feet long and about eighteen or twenty inches wide. It consists of five pieces of timber—to wit, two side pieces, A, and two cross-pieces, $a^2$, fastened together by means of tenons and mortises, or in any other substantial manner, and a beam, $a^3$, secured to the front cross-piece, $a^2$.

In Fig. 1 $a^3$ represents a beam, which is rigidly secured to the front cross-piece, $a^2$, of the frame-work, to the front end of which is attached a single or double tree for drawing the machine. About the middle of this beam is an oblong mortise-hole, K, through which is projected a plow-standard provided with a furrow-opener, C, which may be adjusted to run deep or shallow, and secured in place by means of a key, $f$. This plow-standard and furrow-opener may be removed where the ground is exceedingly rough, and the machine converted into and run as a dropper and coverer. Immediately in the rear of this front cross-piece, $a^2$, and between the side pieces, A, is placed a drum, B. This drum is made about sixteen or eighteen inches long and about twenty inches in diameter, and is secured in place by means of an axle passing through its center, the ends of which rest in suitable bearings, $h$, of side pieces, A, of the frame-work of the machine. Equidistant from either end of this drum holes $c^2$ are made in its periphery large enough for cotton-seed to fall through. These holes are made about six or eight inches distant from each other. On either side of the track of these holes are driven spikes $c^3$, of any suitable size, and of such length that the points will extend through into the inside of the drum three or four inches, as is shown. This drum is also provided with triangular cross-bars $b^2$, extending its entire length. Either end of these bars is secured in each head-piece of the drum. They are equal in number to the number of holes $c^2$ in the drum, and are inserted through the heads of the drum, about three or four inches from the rims thereof, at equal distances from each other, and equidistant from their two nearest holes $c^2$, and with one of their sharp edges pointing to the center of the drum. The office of these spikes and bars is to prevent the cotton-seed from rolling on the rim of the drum on its inner side, and thus making into balls. They keep the seeds constantly stirred and cut apart. The spikes take the seeds up on the back side of the drum as it rolls forward and throw them from the rear and top of the drum to its lower edge, and the seeds, thus falling across the sharp edges of the bars and on the sharp points of the spikes, are kept constantly broken apart, and may easily pass through the holes $c^2$. The triangular-shaped bars, having one of their sharp edges pointing to the center of the drum, create two inclined planes by two of its flat sides, which point to holes $c^2$, and the seeds, falling on these inclined planes, are directed to holes $c^2$, all of which will be understood by reference to drum B, Fig. 1. Around the middle of this drum and on either side of the track of the row of holes $c^2$, Fig. 2, is a rim or band, D. These rims or bands are square and the same size, from one to two inches deep and about the same in width. Their office is to protect the holes $c^2$ from becoming clogged with dirt. This drum is also provided with a slide-gate, $d$. This gate is slightly V-shaped, so that it may be driven in and out at pleasure, and is secured in place by means of a key, $d'$, driven between it and the bands D D. The office of this gate is to admit cotton-seeds into the drum and secure them to be dropped through holes $c^2$.

In the rear end of the frame-work is a harrow, E, having two or more teeth for covering the seeds dropped by the drum B. This harrow is pivoted by its side pieces, $e'$, on rod $e$, so that it will move up and down, and thus adapt itself to the uneven surface of the ground, and is of sufficient weight, in ordinary soil, to cover the seed without any pressure being put upon the handles $i$ of the planter; but is so constructed that its side pieces, $e'$, play immediately under cross-piece $a^2$ in the rear of frame-work, yet without touching said piece, and yet so near that a little pressure on the handles of the planter will bring the cross-piece $a^2$ in contact with side pieces, $e'$, of the harrow and drive its teeth into the hard spots of soil. This harrow may be raised from the ground in turning from one row to another, or in passing from one piece of ground to another, by means of strap or cord $g$, attached to the harrow and handles $i$ of the planter, in easy reach of the operator. It may also be regulated to run deep or shallow by passing its pivoting-rod $e$ through holes $c^2$, as shown in Fig. 1.

Having thus fully described my invention, what I claim as new, and desire to secure by Letters Patent, is—

1. In a cotton-seed planter, the drum B, having holes $c^2$, continuous square bands D D, passing around the middle and outside of said drum and on either side of said holes $e^2$, spikes $c^3$, and triangular bars $b^2$, secured in either end of said drum, substantially as shown and described.

2. In a cotton-seed planter, the combination of drum B, having holes $c^2$, square bands D D, spikes $c^3$, triangular bars $b^2$, with frame-work A, having beams $a^3$, plow-point C, self-adjusting harrow E, pivoted to said frame-work by means of rod $e$, cord $g$, and handles $i$, substantially as shown and described, and for the purposes set forth.

In testimony whereof I affix my signature in presence of two witnesses.

JOHN ROBT. CARTER.

Witnesses:
J. M. SULLIVAN,
J. S. STARK.